United States Patent [19]

Owen et al.

[11] Patent Number: 4,936,259
[45] Date of Patent: Jun. 26, 1990

[54] COMB STRUCTURE WITH ROTATABLE TEETH

[76] Inventors: Ronald C. Owen, Rte. 2, Box 124, W. County Line Rd., Barrington, Ill. 60010; Edward C. Romanowski, 4731 N. Kostner, Chicago, Ill.

[21] Appl. No.: 401,969

[22] Filed: Sep. 1, 1989

[51] Int. Cl.5 ...................... A45D 24/00; A01K 13/00
[52] U.S. Cl. ........................................ 119/83; 132/151
[58] Field of Search ...................... 119/83, 85, 86, 91; 132/151, 152, 153, 154, 155, 121

[56] References Cited

U.S. PATENT DOCUMENTS

| | | | |
|---|---|---|---|
| 883,598 | 3/1908 | Warren | 132/151 |
| 1,330,675 | 2/1920 | Besson | 132/151 |
| 2,546,541 | 3/1951 | Hunt | 132/151 |
| 2,808,062 | 10/1957 | Schiffman | 132/151 |
| 3,354,890 | 11/1967 | Lollison | 132/155 |
| 3,855,689 | 12/1974 | Schiffman | 29/433 |
| 4,114,222 | 9/1978 | Serediuk | 132/151 |
| 4,187,866 | 2/1980 | Zwiren et al. | 132/151 |
| 4,295,480 | 11/1981 | Biela | 132/151 |

FOREIGN PATENT DOCUMENTS

| 505335 | 9/1930 | Fed. Rep. of Germany | 132/151 |
|---|---|---|---|
| 829066 | 5/1981 | U.S.S.R. | 119/83 |

*Primary Examiner*—John Weiss
*Attorney, Agent, or Firm*—Roger J. French

[57] ABSTRACT

A comb having closely spaced rotatable teeth which can be mass produced in an efficient manner. The comb is composed of a handle having a recess formed therein for receiving a tooth holder portion in which the teeth are axially rotatably retained. The tooth holder portion is composed of two sections, each having axial halves of generally cylindrical bores formed thereon such that when the surfaces in which the bore halves are formed are brough into facially abutting engagement, and the sections are attached, teeth can be inserted into the bores formed therebetween and retained therein. Each tooth is formed with a generally rounded end which contacts the area to be groomed and an opposite end having an enlarged head portion formed thereon having a diameter generally larger than the diameter of the bore through which the tooth axially projects. The spacing of the teeth is close enough such that when the comb is used for grooming a pet, any fleas present will be trapped against the comb and can be removed from the hair.

17 Claims, 2 Drawing Sheets

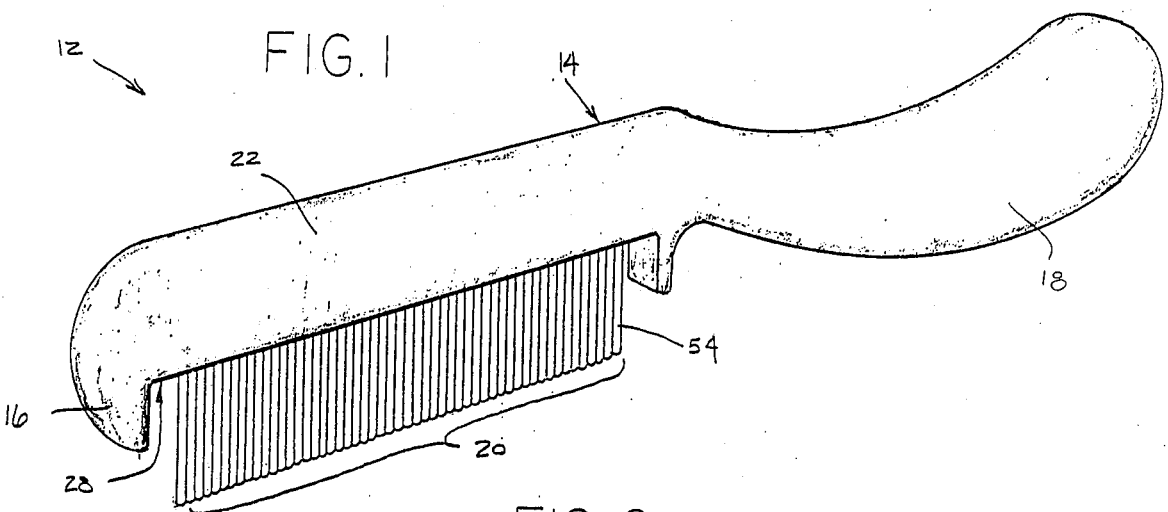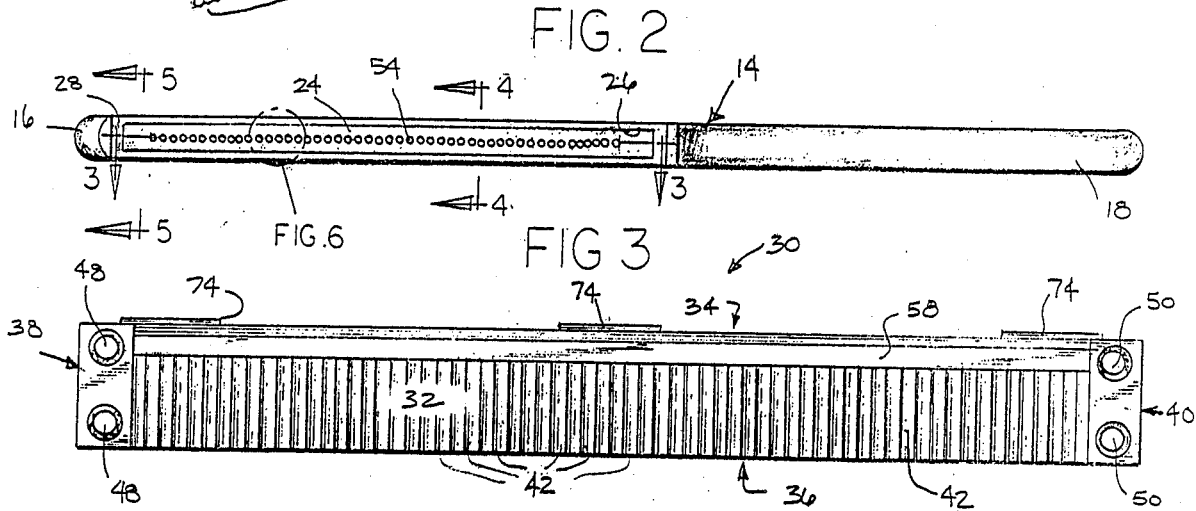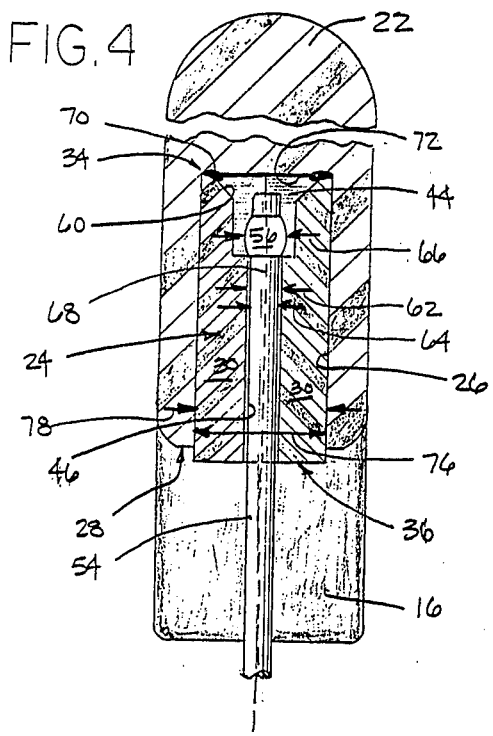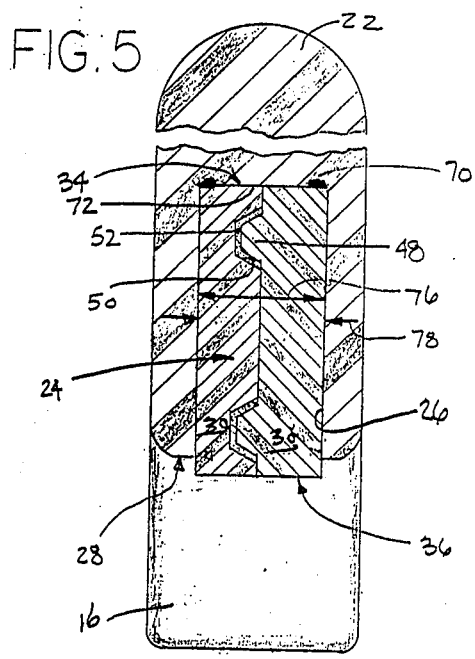

COMB STRUCTURE WITH ROTATABLE TEETH

BACKGROUND OF THE INVENTION

The invention relates generally to the comb arts and more specifically to a comb with rotatable teeth which may be used for example for grooming pets.

A variety of combs having rotatable teeth are currently available. The rotatable action of the teeth in such a comb prevents pulling out hair when a tangle is encountered during grooming. Such combs can be found in U.S. Pat. Nos. 2,808,062 to Schiffman, 3,855,689 to Schiffman, 4,187,866 to Zwiren et al. and 4,295,480 to Biela. Schiffman '062 shows a comb with rotatable teeth which are loaded into a first supporting member sideways and locked into the first supporting member by a second supporting member. The supporting members with the teeth loaded therein are inserted into a handle structure. The Schiffman comb presents a problem of inefficient assembly, requiring precision placement and retention of the teeth in the first supporting member prior to affixing the second supporting member.

The method of making a comb illustrated in Schiffman '689 helps to improve the efficiency of assembling such a comb in that a comb body is provided with multiple bores therethrough for receiving the teeth. Once the teeth are received in these bores, the cavity through which the teeth were inserted into the bores is sealed by a top piece. However, this method also presents a problem in that the mold which is used to form the comb body with the multiple bores must be very complex and of high precision to reliably form the numerous holes. In the alternative, if the bores are drilled into the comb body, after the comb body is formed, the drilling process must be of high precision and introduces the potential for error in alignment and spacing. Such drilling is also an inherently expensive process.

The comb taught in Zwiren et al. '866 is very similar to Schiffman '689 in that a tooth retaining member mounts in a recess within a handle and is ultrasonically welded therein. The Zwiren et al. comb, similar to Schiffman '866, requires a high precision molding or drilling process to achieve the required number of tooth-receiving bores with the required spacing and alignment. Such problems reduce the efficiency and economy of mass production.

Biela '480 and Schiffman '062 teach very similar methods for mounting comb teeth within the tooth retaining portion. Biela '480 reduces the problems associated with retaining the teeth in the retaining structure by providing for better retention and alignment of the teeth prior to mounting the second portion of the tooth retaining holder. However, this comb structure and its assembly also is inefficient for mass production.

A common problem among the four combs noted above is that each design is not conducive to very close tooth spacing. For example, in the combs which require placement of the teeth on a first support member of a tooth holding portion prior to sealing the tooth holder portion with a second support member, close spacing is difficult to achieve because of the number of teeth and the complexity of positioning the teeth. Similarly, in the combs in which the bores are formed or drilled into a single tooth retaining portion, it is very difficult to maintain a high degree of positional and alignment precision using a drilling or other bore forming process.

OBJECTS AND SUMMARY OF THE INVENTION

An object of the present invention is to provide a comb with rotatable teeth wherein the teeth are closely spaced.

Another object of the present invention is to provide a comb with closely spaced rotatable teeth which can be easily and efficiently assembled using mass production techniques.

Yet another object of the present invention is to provide a comb with closely spaced rotatable teeth wherein the teeth are spaced closely enough to trap and remove fleas or the like as the comb is moved through a hair coated area.

Briefly, and in accordance with the foregoing, the present invention provides a comb having closely spaced rotatable teeth which can be mass produced in an efficient manner. The comb comprises a handle having a recess formed therein for receiving a tooth holder portion in which the teeth are axially rotatably retained. The tooth holder portion is comprised of two sections each having axial halves of bores formed thereon such that when the surfaces in which the bore halves are formed are brought into facially abutting engagement, and the sections are attached, teeth can be inserted into the bores formed therebetween and retained therein. Each tooth is formed with an enlarged head portion having a diameter generally larger than the diameter of the bore through which the tooth axially projects.

BRIEF DESCRIPTION OF THE DRAWINGS

The features of the present invention which are believed to be novel are set forth with particularity in the appended claims. The organization and manner of operation of the invention, together with the further objects and advantages thereof, may best be understood by reference to the following description taken in connection with the accompanying drawings in which like reference numerals identify like elements in which:

FIG. 1 is a perspective view of a comb looking from the front of the comb towards a grip portion of the comb and illustrating closely spaced axially aligned teeth retained in an elongated handle portion;

FIG. 2 is a bottom plan view of the comb as illustrated in FIG. 1;

FIG. 3 is an enlarged front elevational view of one section of a holder used in the comb showing axially aligned bore half sections formed on a face thereof and protrusions and mating receptacles formed at either end of the bores;

FIG. 4 is a partial cross-sectional view of the comb taken along the line 4—4 in FIG. 2 illustrating a tooth retained in the holder, and the holder mounted within the elongate handle portion of the comb;

FIG. 5 is a partial cross-sectional view taken along the line 5—5 of FIG. 2 showing engaged and welded protrusions and mating receptacles which hold the two sections of the holder in facially abutting engagement;

DETAILED DESCRIPTION OF THE ILLUSTRATED EMBODIMENT

Figure 6:
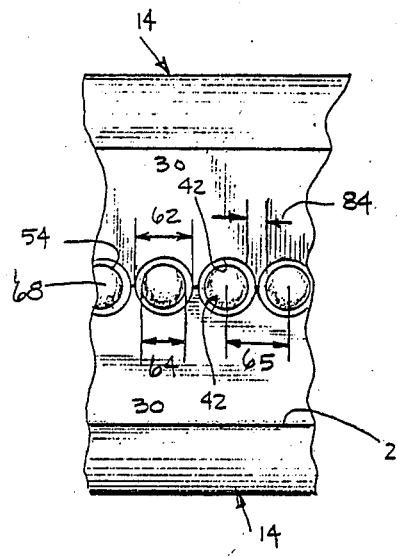
FIG. 6 is an enlarged partial view of the bottom of the comb as illustrated in FIG. 2, showing multiple tooth receiving bores formed by engagement of the two facially abutting sections of the holder means.

While this invention is susceptible to embodiment in many different forms, there is shown in the drawings and will be herein described in detail, one specific embodiment with the understanding that the present disclosure is to be considered an exemplification of the principles of the invention, and is not intended to limit the invention of the embodiment illustrated.

It should be noted that dimensional relationships between members of the illustrated embodiment may vary in practice or may have been varied in the illustrations to emphasize certain features of the invention.

FIG. 1 is a perspective view of a comb 12 having an elongate handle portion 14 with a front 16 and a grip portion 18. A plurality of teeth 20 are closely parallelly rotatably mounted in a spine portion 22 of the elongate handle portion 14. Details of the rotatability and mounting of the teeth 20 will be described in further detail hereinbelow. The handle portion 14 is integrally formed of a suitable plastic material and the teeth 20 are preferably, although not necessarily, formed of metal.

FIG. 2 is a bottom view of the comb 12 illustrated in FIG. 1 revealing elongate tooth holder means 24. As shown in FIG. 2, a recess 26 is formed in the bottom side 28 of the spine 22 to receive the tooth holder means 24 which secures the teeth 20 relative to the elongate handle portion or handle 14. The recess 26 and holder means 24 generally extend from near the front end 16 to the area where the grip portion 18 meets the spine 22. Engagement of the holder means 24 having a plurality of teeth 20 rotatably disposed therein with the recess 26, securely retains the teeth 20 in generally close parallel arrangement.

The holder means 24 as illustrated in FIG. 2 comprises two facially abutting (and preferably, although not necessarily, are substantially identical) sections 30. An enlarged front elevational view of one section 30 of the holder means 24 is illustrated in FIG. 3. As shown in FIG. 3, the section 30 has a face 32 which facially abuts a corresponding face on a mating section, a top 34, a bottom 36, a first end 38, and a second end 40. The face 32 is formed with a series of spaced apart generally parallel and axially aligned bore halves 42. These bore halves project from a cavity portion 44 formed in the top 34 along the face 32 down to the bottom 36. As is shown in greater detail in FIGS. 4 and 6, when a pair of sections 30 are brought into facially abutting engagement the half bores 42 of the face 32 engage to form cylindrical tooth receiving bores 46 extending through the holder means 24.

As illustrated in FIG. 3, adjacent the first end 38, the face 32 is formed with a pair of protrusions 48 while adjacent the second end 40 the face 32 is formed with a pair of receptacles 50. The protrusions and receptacles are formed for complementary mating engagement with the protrusions and receptacles on a like section. Since the two sections 30 which form the holder means 24 when facially engaged are substantially identical, the protrusions 48 cooperatively engage a corresponding receptacle 50 formed on the mating section 30 and vice-versa. As shown in greater detail in FIG. 5, when the protrusions 48 and receptacles 50 are brought into engagement they are ultrasoncially welded to form a weld joint 52 therebetween which securely retains the sections 30 in facially abutting engagement to form the holder means 24.

FIG. 4 is a partial cross-sectional view of the comb 12 taken along the line 4—4 in FIG. 2 and illustrating a single tooth 54 of the plurality of teeth 20 retained in the holder means 24 mounted within the recess 26 of the elongate handle portion 14. As illustrated in FIG. 4, with reference to FIG. 3, a cavity 44 is formed in the two sections 30 of the holder means 24 extending inwardly of the top 34. This cavity 44 provides space in which a head portion 56 of the tooth 54 is retained. The cavity 44 is substantially coextensive with the bores 46, i.e., extends between the first end 38 and the second end 40 of the section 30 as illustrated in FIG. 3. Similar to the tooth receiving bores 46, the cavity 44 is formed by joining two identical half cavities 58 formed in each of two sections 30. The uppermost portions of the inside walls of the cavity 44 are formed with inwardly sloping lead-in surfaces 60 which are formed to facilitate entry of the tooth 54 into the tooth receiving bore 46 when the sections 30 are joined to form the holder means 24.

FIG. 6 is an enlarged partial view of the bottom of the comb 12 as illustrated in FIG. 2 showing the tooth receiving bores formed by engagement of two facially abutting sections 30 forming the holder means 24. As shown in FIG. 6, each tooth 54 projects through a corresponding tooth receiving bore 46 formed of the two half bores 42. The bores 46 generally have a diameter 62 which is at least slightly greater than a diameter 64 of the tooth 54 permitting rotational movement of the teeth retained therein. Further, the spacing between the teeth 20 is generally small. In the embodiment illustrated herein for purposes of description, the diameter 64 of each tooth 54 is approximately 0.0035 an intertooth distance 65, as measured between the centers (i.e., "on center") of two teeth 54, 54, is approximately 0.0042. With reference to FIG. 4, a diameter 66 of the head 56 is generally greater than the diameter 62 of the bore 46 thereby retaining the tooth 54 in the desired axial orientation within the bore 46. It is the difference in the bore diameter 62 and tooth diameter 64 combined with the retaining action of the head 56 which permits each tooth 54 to rotate about an axis 68 while being retained within the bore 46. Further, the rather small difference between the bore diameter 62 and the tooth diameter 64 helps to retain each tooth in substantially parallel alignment with the multiplicity of teeth 20 within the comb 12 even though the intertooth distance 65 is generally small.

Figure 8:
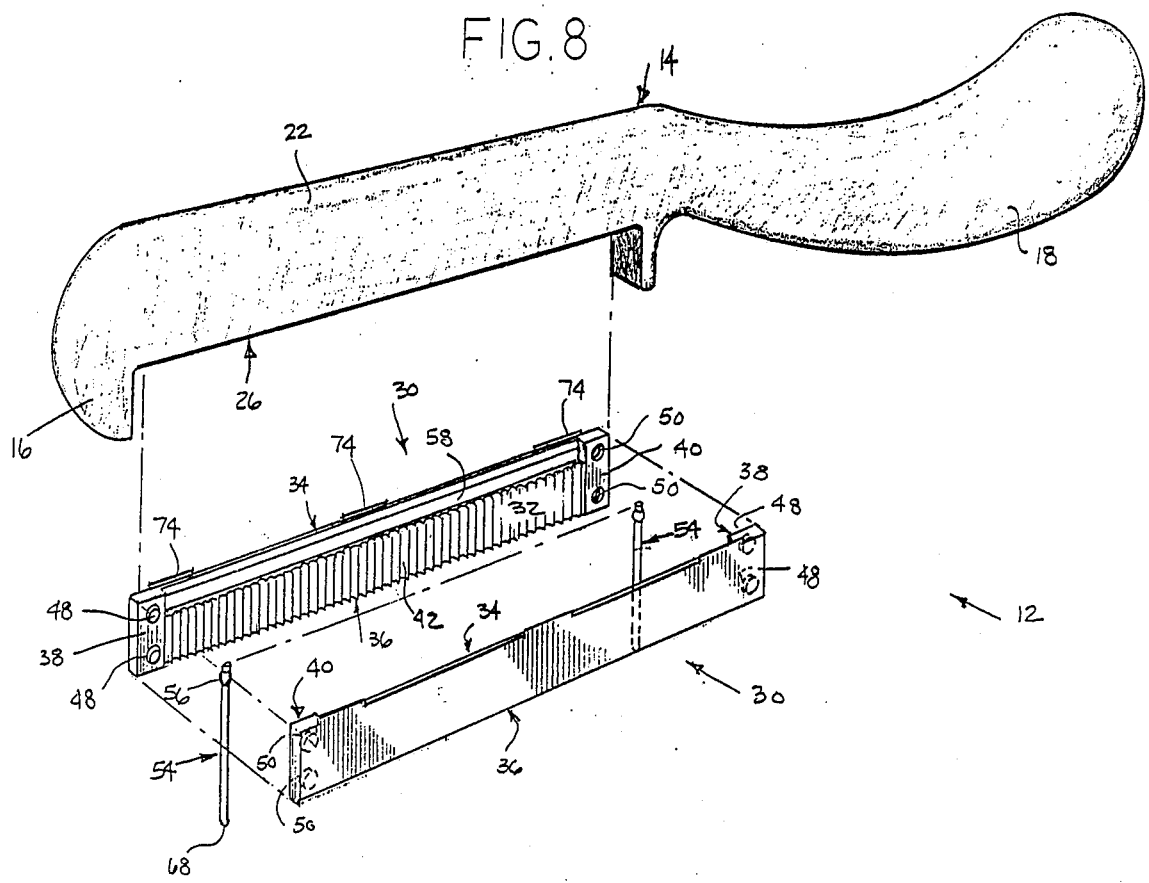
FIG. 8 is an exploded perspective view of the comb illustrating the assembly thereof.

In assembly of the comb 12, a plurality of teeth 20, a handle portion 14 and two sections 30 are required as illustrated in FIG. 8. Each of the two sections 30 is integrally formed as a single piece member of a suitable plastic using only one patter of mold for the sections such that the number and variety of pieces used in assembling the comb is further reduced. By integrally forming the holder means 20 in two sections 30, 30 a substantially greater tolerance can be achieved for the spacing of the bores 46 within the holder means 24 since the bores 46 are not individually formed or drilled. Further, since the two sections 30, 30 are substantially identical, when the two sections 30, 30 are brought into facial engagement the protrusions 48 on one section 30 cooperatively engage the receptacles 50 on the abutting section 30 and vice-versa.

Thus provided with the necessary components of the comb 12, the sections 30, 30 are brought in facial engagement and ultrasonically welded generally in the area where the protrusions 48 engage the receptacles 50. Thus assembled, the teeth 20 are inserted into the bores 46 with a rounded end 68 formed on the end of each tooth 54 distal the head portion 56 inserted first. Each tooth 54 is inserted into a corresponding bore 46 until the head abuts the bottom of the cavity 44 which prohibits further axial movement on the tooth through the bore 46. Once each bore 46 of the holder means 24 has a tooth positioned therein the holder means 24, cavity 44 end first, is inserted into the recess 26 formed in the spine portion 22 of the handle 14. FIG. 4 provides greater detail in the form of a cross-section showing the holder means 24 with a tooth 54 inserted in the tooth receiving bore 56, with the holder means 24 inserted upwardly into the downwardly facing recess 26 of the handle 14.

Thus inserted, a weld joint 70 is created between a top surface 72 of the recess 26 and a weld protrusion 74 formed along the top side 34 of the section 30. The weld joint 70 is shown in FIGS. 4 and 5. The weld joint 70 securely retains the holder means 24 in engagement with the recess 26. Further, an outside dimension 76 of the holder means 24 is generally very close to an inside dimension 78 of the recess 26 formed in the spine 22 of the handle portion 14 to provide a generally tight fit of the holder means 24 in the recess 26. The tight fit of the holder means 24 in the recess 26 tends to press the faces 32 of the sections 30 into closer engagement thus preventing separation of the half bores 42 formed thereon and assuring retention of the teeth 20 therein.

Figure 7:
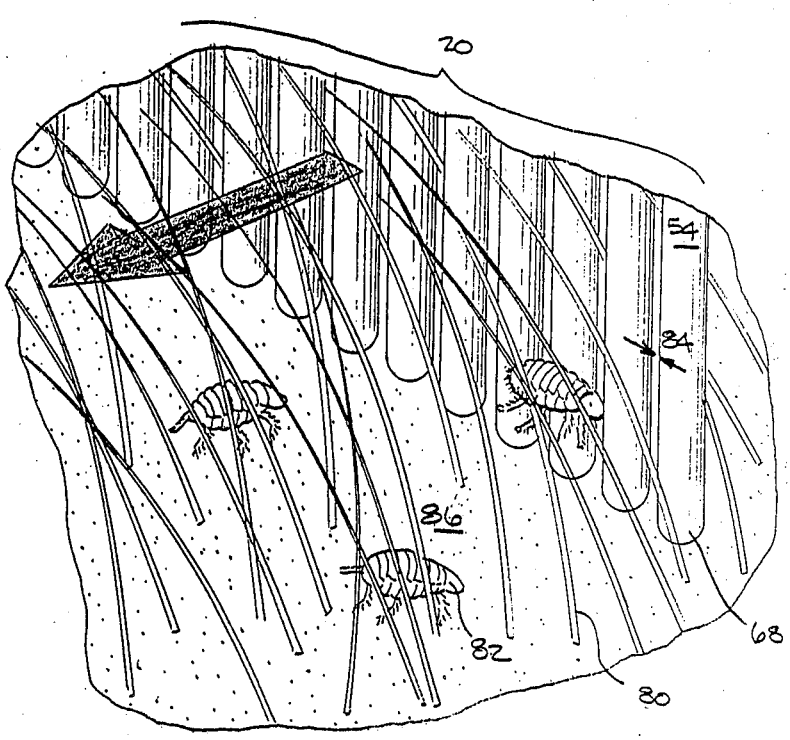
FIG. 7 is an enlarged view of the comb of this invention moving through hair, trapping fleas as it progresses therethrough, and showing the close spacing of the comb teeth which permit the passage of hair therethrough but traps fleas thereagainst.

Thus assembled, the comb 12 can be used to comb a pet or the like for general grooming as well as for the removal of fleas or other foreign matter. As shown in FIG. 7, a greatly enlarged view of several of the teeth 20 of the comb 12 is shown combing through hair 80 whereupon fleas 82 infesting the hair are trapped against the teeth 20 of the comb 12 since the space 84 between the teeth 20 is generally smaller than the size of a flea 82. Also, the rounded ends 68 gently glide across a scalp portion 86 of the hair covered area without causing damage or irritation. Finally, each tooth 54 is capable of independently rotating about its axis 68 to eliminate tangles. While tangles are removed by such rotary action, fleas 82 are not permitted to pass between the teeth since the holder means 24 securely retains the teeth in parallel alignment allowing only nominal deviation in the tooth spacing 84.

While particular embodiments of the present invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent after study. As such, the scope of the invention should not be limited by the particular embodiment and specific construction described herein, but should be defined in the depended claims and equivalents thereof. Accordingly, the aim of the appended claims is to cover all such changes and modifications as fall within the true spirit and scope of the invention.

The invention is claimed as follows:

1. A comb with rotatable teeth for grooming and the like comprising: an elongate handle portion for gripping said comb during use; a recess formed in said handle portion extending generally parallel to the elongate dimension of said handle portion; elongate tooth holder means insertably attachable within said recess for securely retaining a plurality of teeth in said comb; a plurality of tooth receiving bores formed through said holder means into which a corresponding plurality of teeth are disposed; each tooth of said plurality of teeth being generally pin shaped, formed with an enlarged head portion at one end thereof, each tooth of said plurality of teeth being disposed within said holder means by axially inserting the same into one of a plurality of tooth receiving bores formed through said holder means, said head portion of each of said teeth having a dimension generally slightly greater than an inside dimension of said tooth receiving bores for retaining said tooth in operative engagement with said holder means; said holder means comprising two elongate sections, each of said two sections being formed individually and joined in abutting engagement with the other to form said holder means with said plurality of tooth receiving bores formed therethrough.

2. A comb with rotatable teeth according to claim 1 wherein said two sections of said holder means are two substantially identical sections each formed with a face, said tooth receiving bores being formed in said holder means generally spaced apart and axially extending therethrough and aligned in a row, and each of said holder sections forming substantially half of said holder means, said face of each of said sections being formed with substantially one-half of each of said tooth receiving bores, such that when said sections are brought in face-to-face abutting engagement, said tooth receiving bores are defined axially extending therethrough.

3. A comb with rotatable teeth according to claim 2 in which one end of said face of each of said sections is formed with at least one protrusion and the other end is formed with at least one corresponding cooperatively mating receptacle, said protrusion and said receptacle on each of said sections cooperatively mating with a corresponding receptacle and protrusion on the opposing facially abutting section when said sections are brought into facially abutting engagement for retaining said sections in proper alignment to retain said multiple teeth therebetween.

4. A comb with rotatable teeth according to claim 1 in which an inwardly facing surface at each end of each of said sections is formed with at least one of a protrusion and a corresponding cooperatively mating receptacle, said protrusions and receptacles on each of said sections cooperatively mating when said sections are brought into abutting engagement for retaining said sections in proper alignment to retain said multiple teeth therebetween.

5. A comb with rotatable teeth according to claim 1 in which each of said two sections are respectively, unitary, one-piece members integrally formed of plastic.

6. A comb with rotatable teeth according to claim 5 wherein said two sections are ultrasonically welded to join said two sections in cooperative engagement.

7. A comb with rotatable teeth according to claim 1 wherein said tooth receiving bores formed through said holder means are closely spaced for retaining said teeth disposed therein in closely spaced relation to one another.

8. A comb with rotatable teeth according to claim 1 wherein said tooth receiving bores formed through said holder means are approximately 0.0042 on center and said teeth have a diameter of approximately 0.0035.

9. A comb with rotatable teeth according to claim 1 in which said holder means is formed with an elongate cavity for receiving and retaining said head portions of said teeth disposed within said bores formed through said holder means.

10. A comb with rotatable teeth according to claim 9 in which the sides of said cavity are formed sloping inwardly towards the center of said cavity to aid in inserting said teeth into said tooth receiving bores formed in said holder means.

11. A comb with rotatable teeth according to claim 9 wherein at least one ultrasonic welding protrusion is integrally formed along a top edge of said holder means for abutting an inside surface of said recess formed in said handle portion for securing said holder means in engagement with said handle portion.

12. A method of making a comb with rotatable teeth comprising the following steps providing a handle portion; forming two elongated holder sections having a multiplicity of parallel axial half sections of bores formed therein on surfaces which are adapted to abut each other when said sections are brought in facially abutting engagement; joining said two sections in said facially abutting engagement to form a plurality of tooth receiving bores generally spaced apart and aligned in a row; forming a plurality of generally pin-shaped teeth, one end of each tooth being formed with an enlarged head portion; disposing said teeth into said tooth receiving bores formed in said two sections, said teeth being retained in said two sections by said head portions formed thereon; providing a recess in said handle portion formed for cooperatively receiving said two sections with said teeth disposed therein and for covering an open end of said two sections through which said multiple teeth are inserted into said two sections to thereby retain said teeth disposed therein; and mounting said two sections in which said teeth are disposed into said recess formed in said handle.

13. A method of making a comb with rotatable teeth according to claim 12 further including forming said teeth of metal material of sufficient rigidity to withstand hair combing forces.

14. A method of making a comb with rotatable teeth according to claim 12 further including integrally forming each of said two sections as a unitary, single-piece member of plastic.

15. A method of making a comb with rotatable teeth according to claim 12 further including: forming each of said two sections with a face for facially abutting engagement with the other of said sections, each of said two sections forming half of said holder means as sectioned linearly vertically through generally parallel axial centers of said tooth receiving bores; forming on said facially abutting surfaces of each of said two sections cooperatively mating sets of protrusions and receptacles; cooperatively mating said protrusions and said receptacles on each of said sections when said two sections are brought into facially abutting engagement for thereby retaining said two sections in proper alignment for retaining said multiple teeth therebetween in an assembled and rotatable condition.

16. A method of making a comb with rotatable teeth according to claim 15 further including ultrasonically welding said two sections at said protrusions and said cooperatively mating receptacles to positively join said two sections.

17. A method of making a comb with generally closely spaced rotatable teeth comprising the following steps: providing a handle portion; forming two elongated sections having a plurality of half sections of bores formed therein on surfaces which are adapted to abut each other when said two sections are brought into facially abutting engagement; joining said two sections in said facially abutting engagement to form elongated tooth holder means with a plurality of bores generally spaced apart and aligned in a row; forming multiple generally pin-shaped teeth, one end of each tooth being formed with an enlarged head portion and a generally rounded end formed distal said head portion; inserting said teeth, rounded end first, into said bores formed in said holder means, said head portion having a diameter generally greater than the diameter of said bores for retaining said teeth in said holder means; providing a recess in said handle portion formed for cooperatively receiving said holder means with said teeth disposed therein and for covering an open end of said holder means through which said teeth were inserted into said holder means to retain said teeth disposed therein; and mounting said holder means in which said teeth are disposed into said recess formed in said handle.

* * * * *